United States Patent
Davenport

(10) Patent No.: US 7,200,935 B2
(45) Date of Patent: Apr. 10, 2007

(54) WORK ROLL

(75) Inventor: Christopher John Davenport, Rugby (GB)

(73) Assignee: Novelis, Inc., Toronto (CA)

( * ) Notice: Subject to any disclaimer, the term of this patent is extended or adjusted under 35 U.S.C. 154(b) by 0 days.

(21) Appl. No.: 10/311,650

(22) PCT Filed: Jun. 22, 2001

(86) PCT No.: PCT/GB01/02787

§ 371 (c)(1),
(2), (4) Date: Mar. 5, 2004

(87) PCT Pub. No.: WO01/97989

PCT Pub. Date: Dec. 27, 2001

(65) Prior Publication Data

US 2004/0148996 A1 Aug. 5, 2004

(30) Foreign Application Priority Data

Jun. 23, 2000 (GB) ............................... 00305350.1

(51) Int. Cl.
*B21D 53/00* (2006.01)
*B21B 27/00* (2006.01)

(52) U.S. Cl. .................... 29/895; 29/895.2; 29/895.21; 29/895.3; 492/1; 492/3; 492/53; 492/54; 72/199; 72/252.5

(58) Field of Classification Search .................. 29/895, 29/895.211, 895.213, 895.3, 895.2, 895.21, 29/895.33, 17.1, 17.2, 17.3; 492/53, 54, 492/58, 59, 57, 1, 3; 72/199, 226, 252.5
See application file for complete search history.

(56) References Cited

U.S. PATENT DOCUMENTS

| | | | | |
|---|---|---|---|---|
| 2,187,250 A | * | 1/1940 | Sendzimir | 72/241.4 |
| 3,094,956 A | * | 6/1963 | Pauls | 72/54 |
| 3,503,242 A | | 3/1970 | Polakowski | |
| 4,941,251 A | * | 7/1990 | Sobue et al. | 492/3 |
| 5,324,248 A | * | 6/1994 | Quigley | 492/50 |
| 6,374,494 B1 | * | 4/2002 | Sonobe et al. | 29/895.3 |
| 6,393,226 B1 | * | 5/2002 | Charlebois et al. | 399/12 |

FOREIGN PATENT DOCUMENTS

DE 4137459 5/1993

(Continued)

OTHER PUBLICATIONS

Abstract of Japanese Patent Publication No. 62054506, Patent Abstracts of Japan, published Mar. 10, 1987.

*Primary Examiner*—Jermie E. Cozart
(74) *Attorney, Agent, or Firm*—Cooper & Dunham LLP

(57) ABSTRACT

Improved work roll, particularly for use in closed gap rolling, has a composite structure comprising a cylindrical outer layer (14) made of steel, and providing the work surface of the roll, separated from a steel core (12) by an intermediate layer (13) of material such as aluminium or copper having a lower Young's modules than that of the layer (14). Provided that the dimensions of the outer layer (14) and intermediate layer (13) are chosen appropriately, this combination can release a work roll having an affective Young's modules which is lower than that of steel whilst at the same time retaining the advantages of a steel work surface and enabling higher rolling speeds.

3 Claims, 7 Drawing Sheets

FOREIGN PATENT DOCUMENTS

| | | |
|---|---|---|
| DE | 19702325 | 7/1998 |
| EP | 0815970 | 1/1998 |
| EP | 0987065 | 3/2000 |
| FR | 1198191 | 12/1959 |
| JP | 57036056 A * | 2/1982 |
| WO | WO9707281 | 2/1997 |

* cited by examiner

WORK ROLL

The present invention relates to a work roll, and to a method of producing metal foil by rolling metal web, sheets or strips and in particular by cold rolling of the metal. The invention is particularly, but not exclusively, useful in the production of aluminium or aluminium alloy foil especially when closed gap rolling is used. The term metal as used in this specification is intended as reference to a metal and/or its metal alloy. For example, the metal may be aluminium or an aluminium alloy, particularly foil alloys such as AA8006, AA1045 or AA1200.

Methods of cold rolling metal sheets or strips to form metal foil are well known in the art, and make use of work rolls made of steel having a Young's modulus of just over 200 GPa. The metal sheet initially undergoes open gap rolling until it is thin enough to necessitate closed gap rolling.

With reference to FIG. 1, in closed gap rolling opposing edge regions of the circumferential surfaces of the work rolls 1 are in contact beyond the longitudinal edges of the metal strip 6, so that the thickness of the emerging strip is controlled by flattening of the surface of the rolls. Here, the longitudinal edges of the metal strip are taken to mean the edges of the metal strip that lie parallel to the direction of travel. In open gap rolling the work rolls are not in contact beyond the longitudinal edges of the metal strip.

International patent application publication number WO99/48627 describes a method of manufacturing metal foil by cold rolling metal plate initially using work rolls having a Young's modulus between 210 GPa and 310 GPa for carrying out open gap rolling, and later using work rolls having a Young's modulus in excess of 540 GPa for carrying out rolling on at least some of those passes that would have been closed gap if ordinary steel rolls had been used. The final pass or passes are carried out using work rolls having a Young's modulus between 210 GPa and 310 GPa. This document does not mention work rolls having a Young's modulus below 210 GPa or use thereof. Indeed, this document suggests that "harder" rolls (by which is meant rolls with a higher Young's Modulus) should be used in near closed gap rolling. Also, it does not address the question of how to increase speed of rolling.

DE19702325 describes a method of making rolls and roll sets for vibration dampening. This document teaches the use of a hollow roll or a roll having a longitudinal bore extending along the axis of the roll which may be filled with, for example, lead or tungsten to alter the vibration characteristics of the roll. There is no suggestion that the bore or the filling alters the effective Young's Modulus of the roll.

U.S. Pat. No. 2,187,250 describes a method of compensating for roll deflection. One of the embodiments describes the use of a composite roll comprising a central shaft separated from the steel outer shell by an intermediate layer of material, such as cast iron, having a relatively lower modulus of elasticity. The central shaft is crown shaped so that the intermediate layer is thinner in the middle than at the ends. In this way the elastic effect of the intermediate layer is felt more at the edges of the roll than its centre, thus tending to cancel deflection forces.

U.S. Pat. No. 3,503,242 describes a composite work roll which is designed to overcome the problem of flatness in the rolled product. The roll is designed to elastically deform locally to correct local off-flatness in the product. The roll comprises an outer sleeve of hard material separated from a central arbour by a thin layer of low modulus resilient material such as hard rubber or other elastomer, polyurethane, neoprene butadiene-styrene or similar elastomeric materials.

There are many disadvantages associated with conventional techniques for foil rolling metal sheets. Although the use of work rolls with a high Young's modulus allows a larger reduction in the gauge of the metal per pass, their disadvantage is that they produce poor flatness of the foil. The use of work rolls with low Young's modulus, whilst avoiding the problem of poor flatness of the metal, has the disadvantage of limiting reduction through roll flattening on later passes.

In conventional closed gap rolling methods in order to achieve a small gauge of foil, high loads are used to exert high pressure on the metal through the work rolls, but this has the disadvantage that, beyond a certain load only deformation of the work rolls occurs and so no further reduction of gauge will result.

A further disadvantage is that presently the speed of the mill is used to control the exit gauge of the foil. When the rolls are freshly ground and the friction between the rolls and the foil is high, the sheet can be rolled faster. As the work rolls wear, they become smoother and the friction decreases. To compensate for the loss of load resulting from this, the mill must be slowed down, thus limiting its productivity. Much effort is presently spent on maintaining a high friction by the use of various roll grinding techniques. When the work rolls wear smooth they must be removed from the mill and be re-ground to regain their high friction properties. In most foil mills, rolls may have to be re-ground after only a few hours of use.

The inventor has found that reducing the effective Young's modulus of at least one of the work rolls, although counter-intuitive, addresses these problems and in particular allows the speed of the mill to be increased. Accordingly, a first aspect of the present invention provides a work roll for use in the reduction of the thickness of metal sheet, the work roll having an effective Young's modulus in the range 40 GPa to 190 GPa.

According to a second aspect of the present invention there is provided a method for reducing the thickness of metal sheet by cold rolling comprising the steps of rolling the metal sheet at least once using work rolls at least one of which is a roll having an effective Young's Modulus in the range 40 GPa to 190 GPa.

In a preferred embodiment the effective Young's modulus of the work roll is less than 180 GPa, preferably less than 150 GPa and even more preferably less than 120 GPa. In this specification, work rolls having an effective Young's modulus less than 190 GPa will be referred to as compliant rolls.

Young's modulus is an inherent property of a material: for example the Young's modulus for steel is about 210 GPa, whilst for aluminium it is about 70 GPa. Compliance is a property of a structure, being directly related to the displacement (of the structure) in response to a given load applied thereto. Compliance is dependent therefore not just on the inherent properties of the materials making up the structure—in this case the Young's modulus—but also on the structure itself and in particular, its geometry.

Mathematically, the compliance of a work roll is the deformation of the roll h divided by the roll pressure p, and is defined as follows:

$$\text{Compliance} = \frac{h}{p} \quad (1)$$

For the purposes of the present application, compliance can be regarded as directly related to Young's modulus but it should be noted that the compliance of a work roll will change if its geometry is changed and in particular if its diameter is changed. Thus, in the present discussion, it is assumed that the geometric properties of the work roll, and in particular its diameter, are constant. The effect of roll diameter on speed of rolling will be discussed specifically below.

The reason why compliance is important in the context of this invention is that it has been found that increasing the compliance of the roll allows the mill speed to be increased. Since Young's modulus is a significant, although not the only, component of compliance, it will be evident that reducing the Young's modulus which in turn increases the compliance, all other things being equal, will also allow the mill speed to be increased. The challenge is to provide a work roll which, on the one hand, has such a reduced Young's modulus but, on the other hand, has a work surface which is hard wearing.

The present invention may replace the need for high friction to achieve thin gauge of foil by the use of compliant rolls. This results in the ability to roll with smoother work rolls which will allow both faster rolling and less frequent work roll changes for re-grinding.

In addition, using one or more compliant rolls improves the flatness of the sheet. It is believed that off-flatness results from mismatch between the thickness profile of the strip entering the roll gap and the roll gap profile. This difference causes an unequal elongation of the strip from place to place across the strip width and consequent off-flatness. Local deflections of the rolls across the roll width can accommodate these differences to some extent. Compliant rolls allow greater differences to be accommodated without increasing the off-flatness of the strip exiting the rolling mill. Using compliant rolls, the thickness profile variations of the incoming strip tend to remain as thickness variations rather than being translated into local variations in length.

In a preferred embodiment, the compliant rolls are positioned, in use, such that opposing edge regions of their circumferential surfaces are touching the corresponding edge regions of the other work roll or rolls (closed gap rolling). Alternately, the compliant rolls are positioned in use such that their opposing edge regions are close to touching, but not touching, the corresponding edge regions of the other work roll or rolls (near closed gap rolling). In both circumstances the compliant rolls may be used in combination with speed control to achieve the desired thickness of foil. The compliant rolls allow a higher speed to be used to obtain a given thickness.

As already mentioned, Young's modulus is a material property and is thus not easily altered for a given material. In a preferred embodiment of the invention there is used a composite work roll that has an effective Young's modulus which is very different from that of solid steel. Such a composite work roll is preferably fabricated as a core on which is mounted one or more cylindrical layers. In all cases the outermost layer, forming the work surface of the roll, is made from a relatively hard material such as steel or chrome to act as a wear resistant surface to the roll. Underneath the outermost layer is a layer of compliant material such as aluminium, copper, or magnesium and it is the existence of this compliant layer that gives the work roll, as a whole, its compliance. Controlling the thickness of the outer layer (which is assumed to have a high Young's modulus) and the inner layer (which is assumed to have a lower Young's modulus) enables the degree of compliance to be adjusted, as will be explained in more detail below.

In a composite roll having just a single cylindrical layer over the core, then this single layer is the hard outer layer and the core is the compliant inner layer. Where there are two layers over the core, then the core may be made of hard material such as steel, and the compliant inner layer takes the form of an intermediate layer lying between the core and the outermost layer. Still further layers may be used, if needed to achieve particular characteristics.

The outermost layer of the composite roll needs to be reasonably thick otherwise it is difficult to manufacture. In addition it is preferable to provide some excess thickness to allow for regrinding of the roll as it wears. On the other hand, the thicker the outermost layer, the more the effect of the compliant inner layer will be masked, and a compromise therefore has to be reached. The absolute minimum radial thickness is probably about 4 mm with about 5 mm as the preferred minimum thickness. However, outer layers which are even thinner than this may be used, and have the advantage or providing the maximum compliance. For example, metal or carbide outer layers only 20 microns thick can be applied by flame or plasma spray deposition. When worn, these layers may be repaired by re-spraying rather than regrinding. The maximum radial thickness to avoid excessive masking of the effect of the inner layer is 20 mm. However, the maximum thickness is preferably about 15 mm and even more preferably about 8 mm.

In embodiments where the inner layer takes the form of an intermediate layer positioned between a core and the outermost layer, the intermediate layer is preferably between 20 to 40 mm thick. However some benefit is obtained with quite a thin intermediate layer, say down to 5 mm, but the preferred minimum thickness is 10 mm. In any event, it is preferred that the outermost layer is thinner, in the radial direction, than the intermediate layer.

Preferably the Young's Modulus of the material of the inner layer lies in the range of about 40 GPa to about 150 GPa, this covering magnesium at the lower end (about 44 GPa) and copper at the upper end (about 120 GPa). The preferred range however is 40 GPa to 120 GPa, with aluminium (about 70 GPa) as the preferred material. Materials with very low Young's Modulus, for example flexible plastics material or rubber, are not suitable since these will not have sufficient strength to transmit the very considerable drive forces which are involved in the rolling of metals. Moreover the outer shell of the roll will be able to move too much relative to the core. In addition, such materials will tend to act simply in the manner of a flexible coupling, and will not provide the composite effect required. Rather, what is needed is a structure in which the outermost hard layer and the inner compliant layer act together to provide the required effective Young's Modulus.

A work roll having a composite structure such as discussed above will have a Young's modulus which is the resultant of the Young's modulus of the component materials making up the roll. Such a work roll is said to have an effective Young's modulus such that the elastic response of the composite roll to an applied load is the same as that of a solid roll of the same external dimensions made of a material having a Young's modulus equal to the effective Young's modulus.

A way of calculating/measuring the effective Young's modulus of such a composite roll will be described below with reference to FIG. 2 which shows part of the circumference of a work roll 1.

If the elastic surface deflection of a composite roll 1 under a given pressure is h, the effective Young's Modulus of that roll is equal to the Young's Modulus of a material which when made into a solid roll of the same diameter, is deflected by the same amount, h, under the same pressure.

Embodiments of the present invention will now be described by way of example with reference to the accompanying drawings in which.

Figure 5:
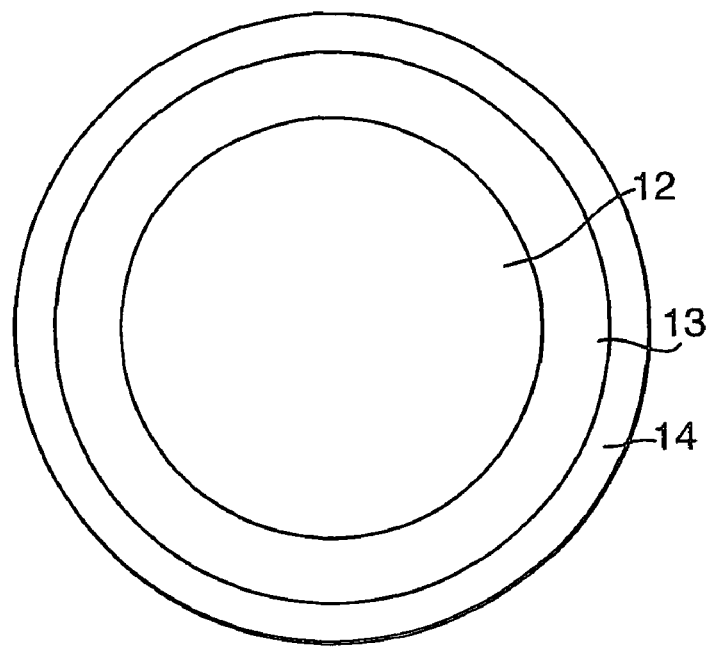
FIG. 5 is a cross-sectional view of an alternative embodiment of a compliant roll having a composite structure in accordance with the present invention.
Figure 9:
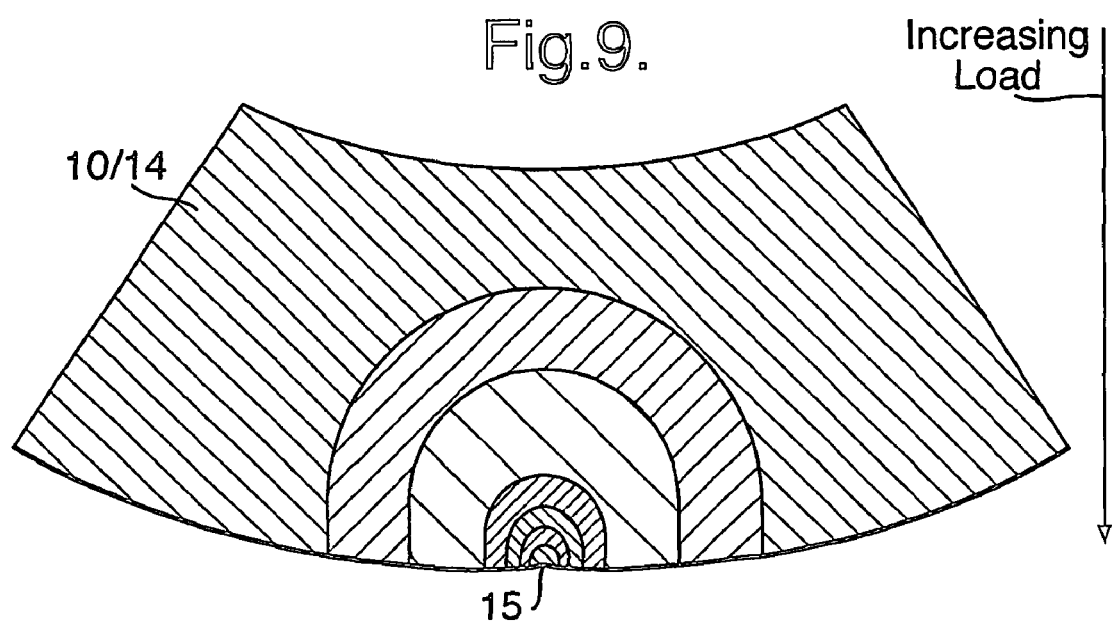
Figure 6A:
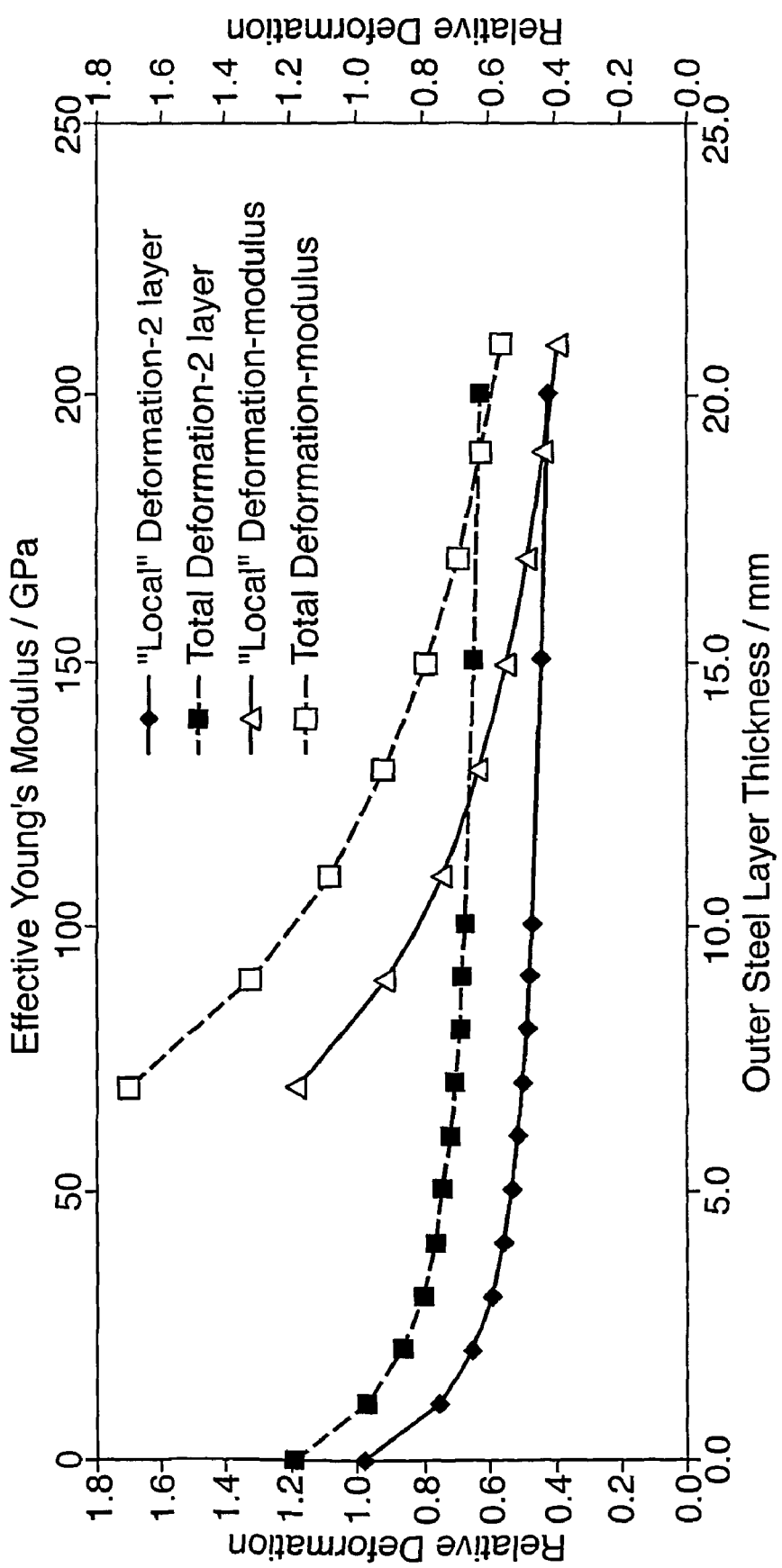
Figure 6B:
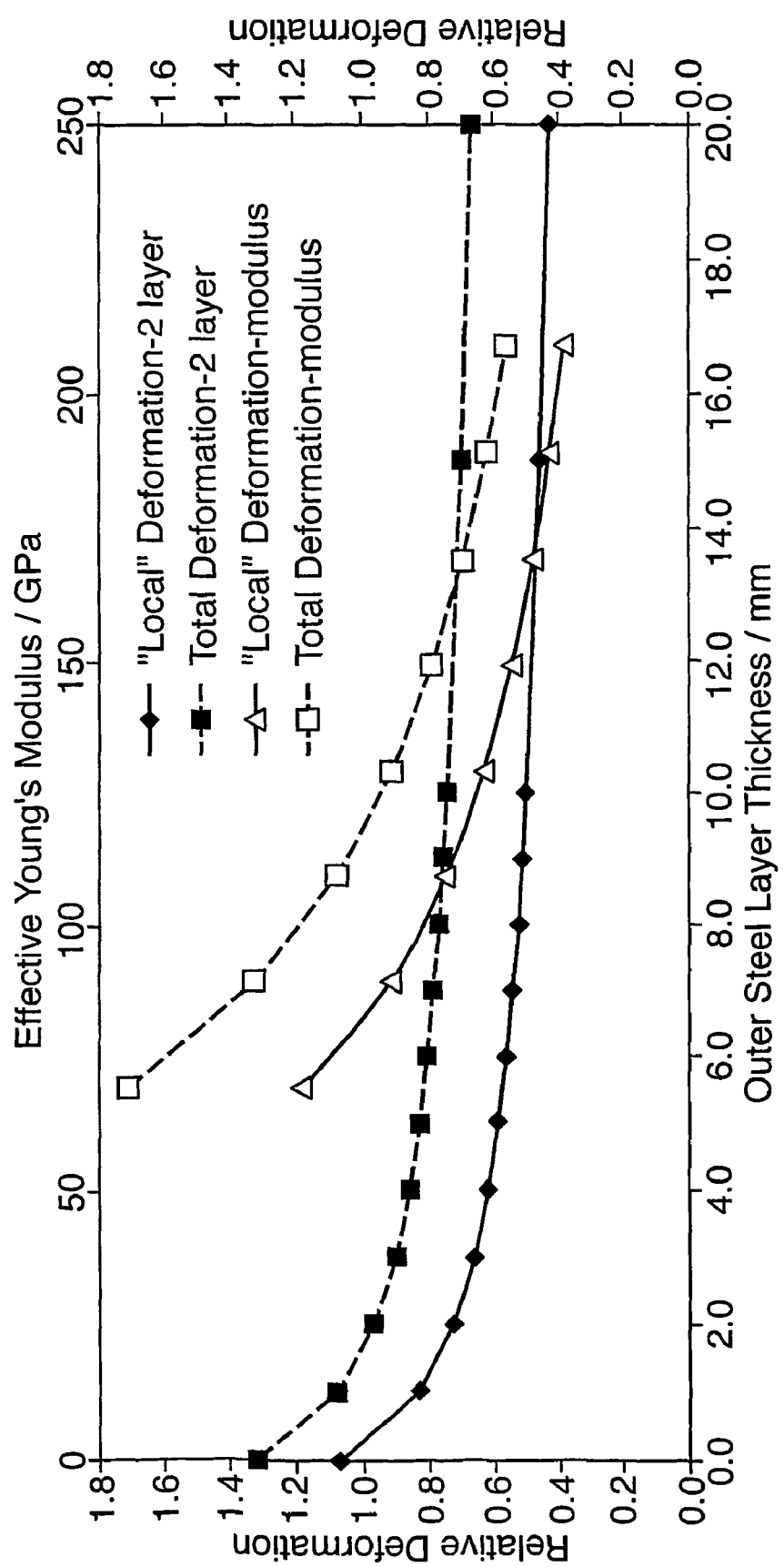
Figure 6C:
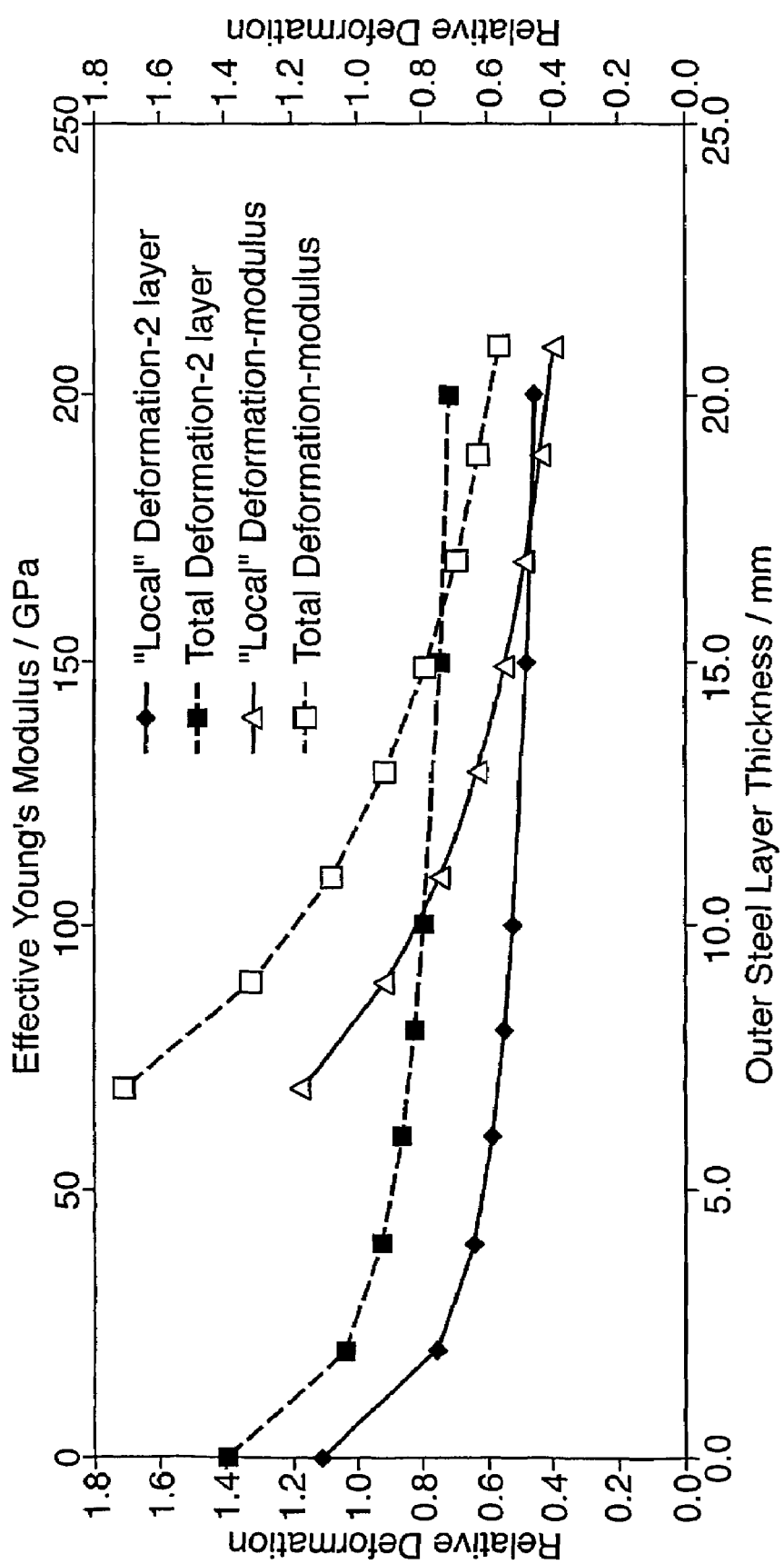
Figure 7:
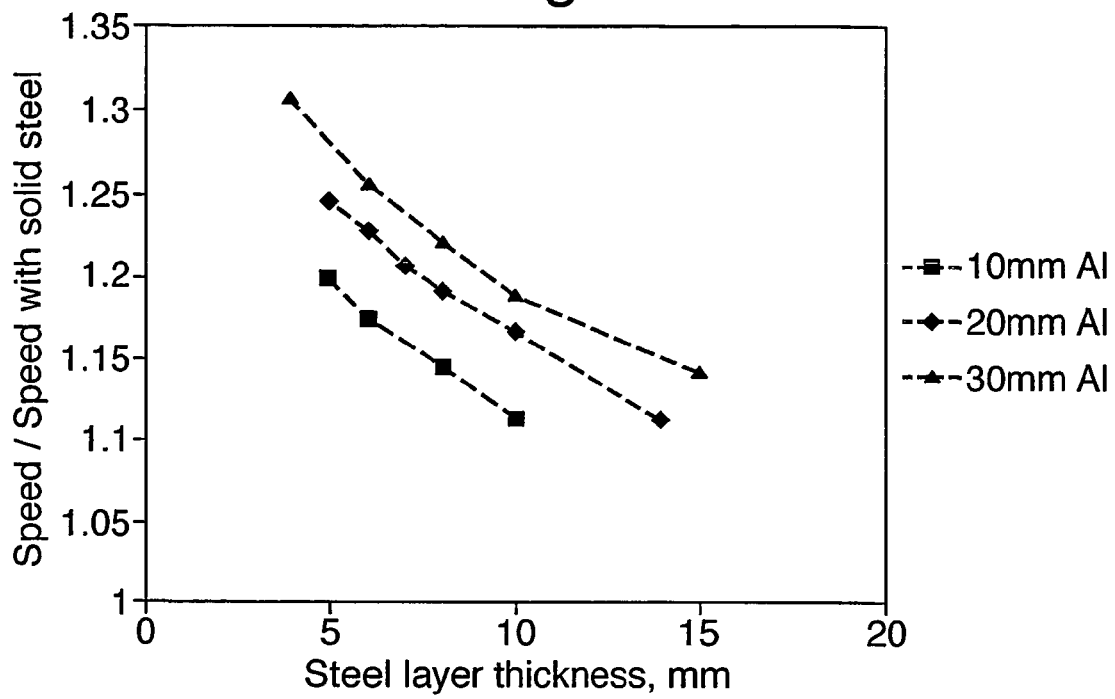
Figure 8:
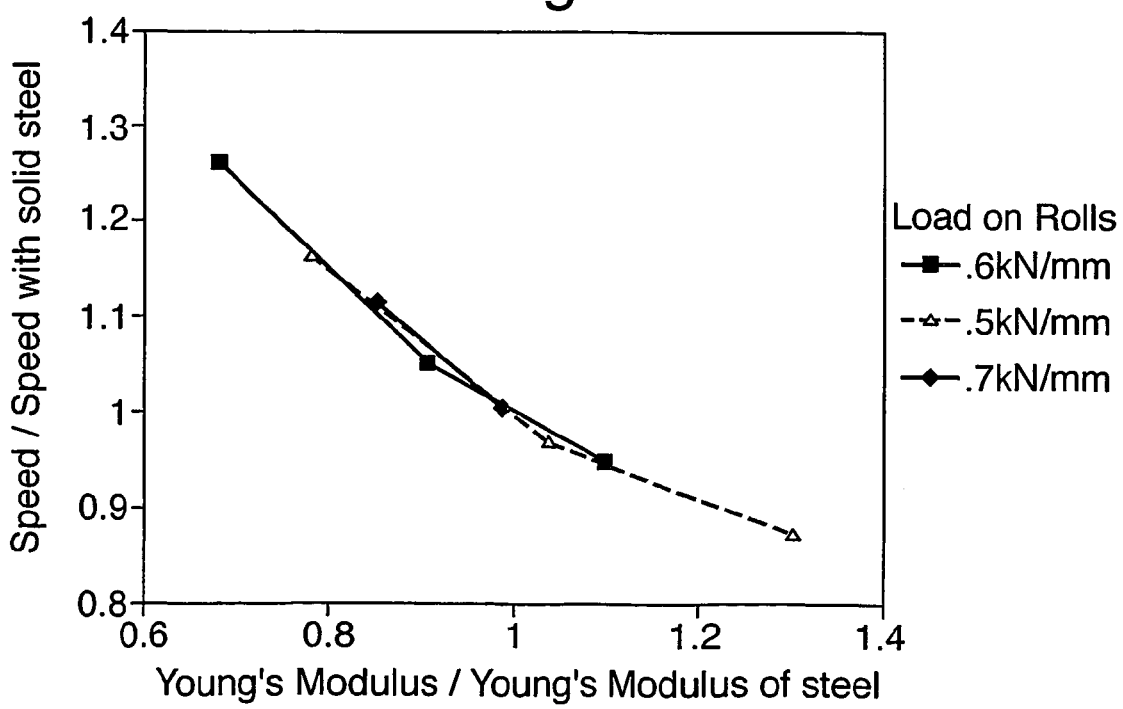

FIGS. 6A–C are graphs of relative deformation against layer thickness and effective Young's Modulus for the embodiment of FIG. 5;

FIG. 7 is a graph of throughput speed against layer thickness for the embodiment of FIG. 5;

FIG. 8 is a graph of throughput normalised speed against normalised effective Young's modulus; and FIG. 9 is a cross-sectional view of a compliant roll taken perpendicular to its axis of rotation showing the distribution of stresses in the roll of the present invention.

Figure 1:
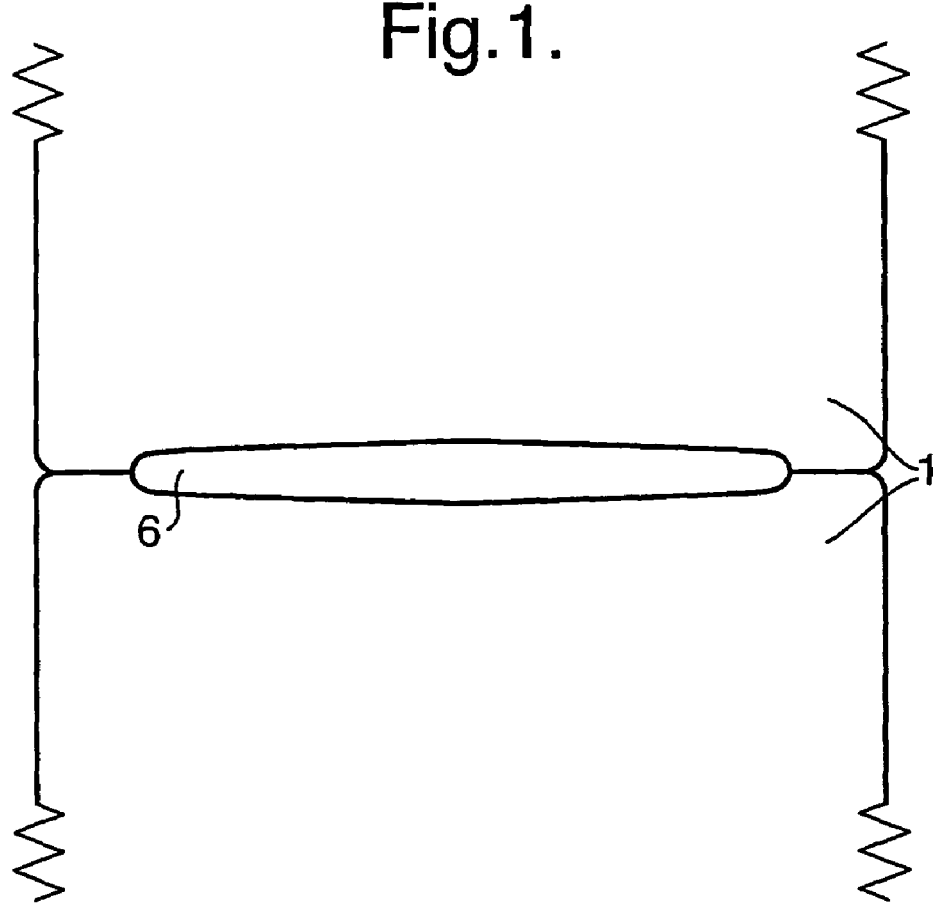
FIG. 1 is a cross-sectional view of closed gap rolling of metal sheet taken perpendicular to the direction of travel of the metal sheet.
Figure 2:
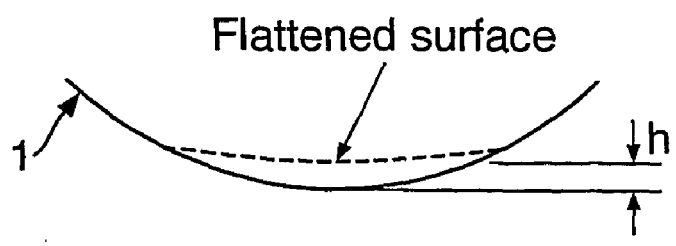
FIG. 2 is a diagram illustrating how an effective Young's modulus may be calculated.
Figure 3:
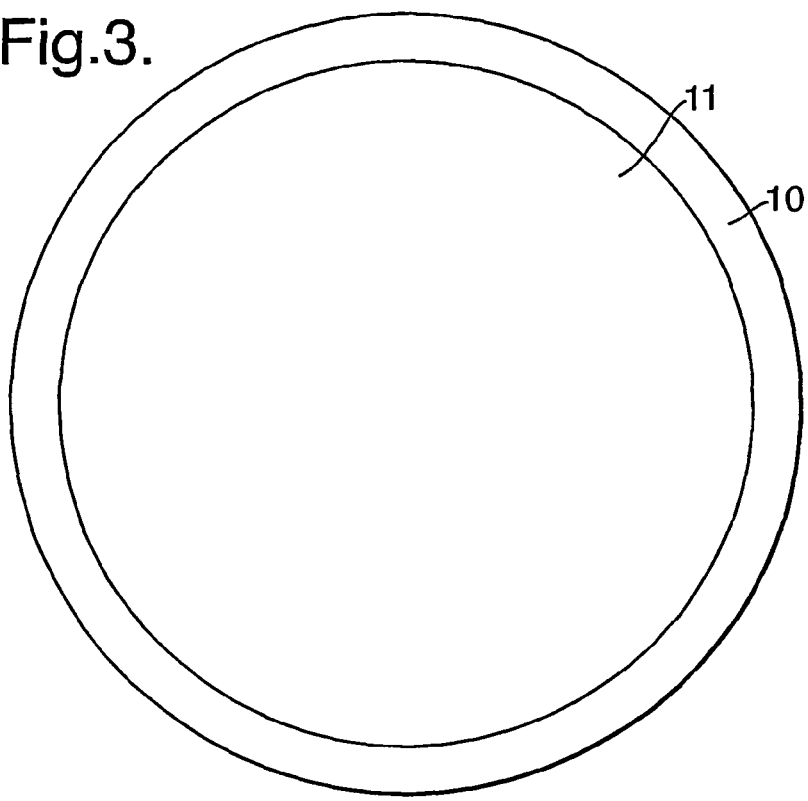
FIG. 3 is a cross-sectional view of a first embodiment of a compliant roll having a composite structure in accordance with the present invention.

Referring to FIG. 3, there is shown a compliant roll 1 having a composite structure. The roll 1 has a work surface which takes the form of an outer layer 10 made from a material with a high Young's Modulus, for example steel, whilst having an interior 11 made from a material with a lower Young's modulus, for example aluminium or copper, thereby allowing the work roll to have a work surface which is hard wearing whilst having an effective Young's modulus that is less than that of steel.

For example, the composite roll of FIG. 3 may consist of an aluminium core 11 having a Young's modulus of about 70 GPa with an outer steel layer 10 having a Young's modulus of about 210 GPa. The purpose here is to create a work roll with a work surface that is hard wearing and which will not stick to the sheet being rolled, but which has an effective Young's modulus and compliance nearer to that of the underlying aluminium. The aluminium core 11 is cylindrical in shape and has a constant cross section along the working length of the roll. The outer steel layer 10 is of a hollow cylindrical shape and is joined to the core 11 by any suitable means, such as shrink fitting or adhesive, or the core may be cast in situ into the interior of the cylindrical layer 10.

Figure 4:
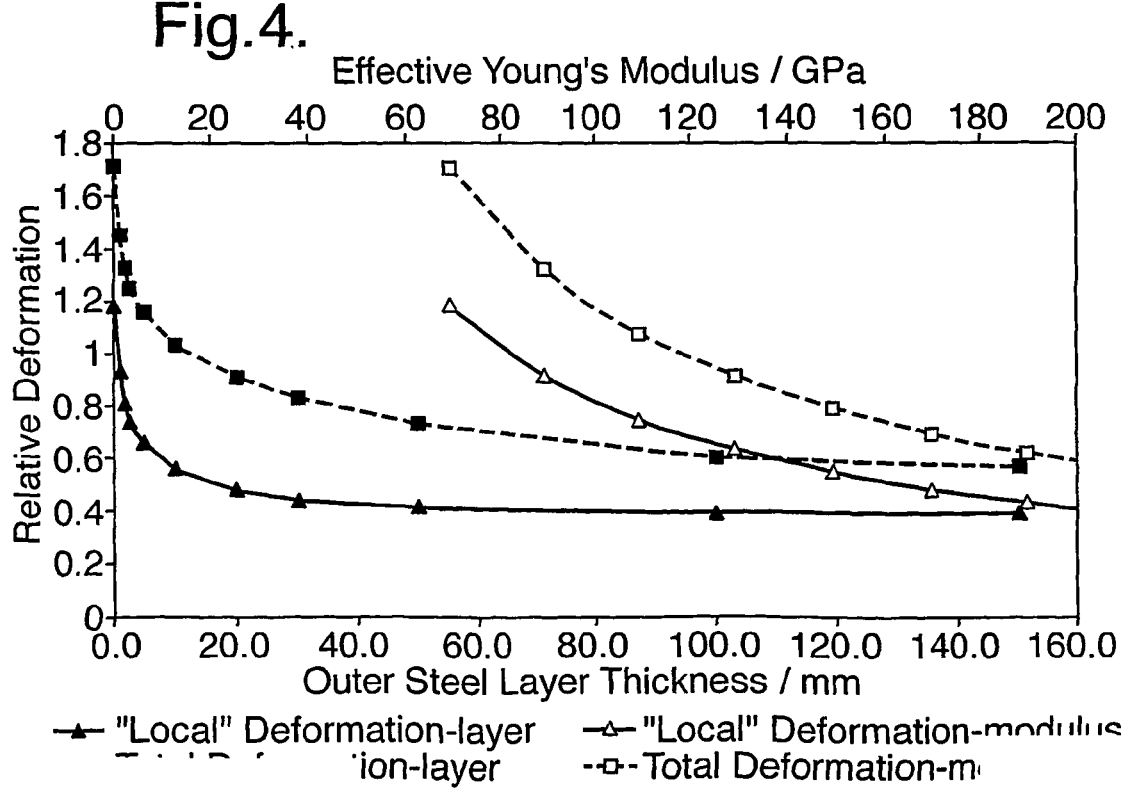
FIG. 4 is a graph of relative deformation against layer thickness and effective Young's Modulus for the embodiment of FIG. 3.

FIG. 4 shows how the effective Young's modulus of the composite work roll can be varied by changing the thickness of the outer steel layer 10. The vertical axis shows relative deformation, which is in arbitrary units of length, being the response of the elastic system to the application of an arbitrary loading. The only requirement is that the deformation is small compared with the roll diameter. The leftmost dotted curve represents the total deformation of the roll when a force is applied across the roll diameter, as during the rolling operation. Some of this deformation is due to bulk deformation of the roll—it becomes slightly elliptical—and the remainder is due to local deformation at the roll surface around the point of contact. It is this local deformation that is most relevant to closed gap rolling and the leftmost solid curve thus shows the local deformation only. It will be noted that the local deformation becomes insensitive to layer thickness at much smaller thicknesses than the total deformation; this is to be expected since the surface effects penetrate only a small distance into the roll. It will also be noted that, when the outer layer is relatively thick (more than 20 mm), the deformation is similar to that of solid steel whereas when the layer is relatively thin (for example 1 mm) it is very similar to that of aluminium.

Therefore a 1 mm thick sleeve of steel shrunk on to an aluminium base would produce a roll with a compliance only slightly lower than that of pure aluminium and so the roll would have a Young's modulus of 43% that of steel. Using such a composite structure for the work rolls would thus allow foil to be rolled about 50% faster than the conventional speeds employed with steel work rolls.

The two rightmost curves indicate the effective Young's modulus for varying thicknesses of layer 10. As before, there are two curves: a solid curve for total deformation and a dotted curve for local deformation. Both curves illustrate how the deformation of the surface varies with Young's modulus from a value of about 70 GPa (corresponding to solid aluminium), to 200 GPa (corresponding to just less than solid steel). This deformation is related to the gauge which would be rolled in closed gap rolling which, with solid steel rolls can vary from about 0.050 to about 0.006 mm. With compliant rolls, closed gap rolling could begin at a thicker gauge. In practice, the mill speed would be increased to bring about closed gap rolling at about the same gauge as it would occur with solid steel rolls.

The effective Young's modulus of the composite work roll shown in FIG. 3 may be obtained by first reading up from a particular value of layer thickness to the local deformation/layer thickness curve and then reading across horizontally to the local deformation/Young's modulus curve to obtain the value of Young's modulus. For example, if the thickness of layer 10 is 10 mm, this can be read from the curve of local deformation/layer thickness to a value of approximately 0.55 which is then read across horizontally to the local deformation/Young's modulus curve to give a value of effective Young's modulus of approximately 152 GPa.

A similar structure for a compliant roll is shown in FIG. 5. In this case the roll consists of a core 12 of steel with an intermediate layer 13 made of a lower Young's Modulus material such as aluminium, and an outer layer 14 made of a higher Young's modulus material such as steel or chrome. The intermediate layer 13 has a uniform cross section along the length of the roll—i.e. its radial thickness is the same at all points along the roll. This structure can be produced using an old, worn steel roll to which the aluminium intermediate layer 13 is applied either mechanically in the form of a sleeve or for example using flame spraying. Finally, the outer layer 14 is applied over the top of the intermediate layer. The outer layer 14 may be applied for example electrolytically or by means of flame or plasma spraying.

The graphs of FIG. 6 correspond to those of FIG. 4, but for the embodiment of FIG. 5. Each of the graphs A, B and C in FIG. 6 plot the relative deformation against the radial thickness of an outer layer 14 of steel for a different radial thickness of the intermediate layer 13:

FIG. 6A—intermediate layer thickness=10 mm

FIG. 6B—intermediate layer thickness=20 mm

FIG. 6C—intermediate layer thickness=30 mm

FIG. 6A shows that when the steel outer layer 14 is 10 mm thick, the effective Young's modulus is about 180 GPa, which is quite close to the solid steel value of 210 GPa. The corresponding values for FIGS. 6B and 6C are 163 GPa and 157 GPa respectively.

FIG. 7 illustrates the effect of different thicknesses of outer layer 14 on the speed of closed gap rolling. In particular, the graph shows the enhancement in speed which is obtainable over the use of solid steel rolls. The graph relates to the embodiment of FIG. 5, and separately charts the speeds for different radial thicknesses of the intermediate layer 13. The lower curve is for an intermediate layer of 10 mm thickness aluminium, the middle curve is 20 mm thick aluminium and the upper curve is 30 mm thick aluminium.

FIG. 8 illustrates more directly the effect of different effective Young's moduli on the speed of closed gap rolling. The horizontal axis of the graph is a dimensionless quantity representing the measured effective Young's modulus compared with that of solid steel. The graph is valid for all rolls within the normal expected size range and or all representative loads. The three curves coincide for mill loads of 0.5 to 0.7 kN/mm, these values being typical of those found in closed gap foil rolling. Mill load is expressed as load in kN per unit width of the roll.

As already mentioned, it is advantageous to use as thick a steel outer layer as possible because this layer is subject to frequent re-grinds during service. For this reason it is also advantageous to use a relatively thick under-lying aluminium layer in order to achieve an effective Young's Modulus which gives significant speed increase. However, increasing the layer thickness above 30 mm has only a relatively small effect as can be seen by comparing FIGS. 6B and 6C when only a small reduction in the effective Young's Modulus was achieved for a layer thickness change from 20 to 30 mm.

Furthermore, increasing the aluminium layer thickness too much can cause another problem. The higher thermal expansion coefficient of aluminium causes an increase in the thermal expansion of the roll which can give rise to an increase in thermal camber (different in expansion between strip centre and strip edge)—which can give rise to strip flatness problems. For these reasons a suitable combination of intermediate and outer layer thicknesses is 30 mm for the intermediate (aluminium) layer and between 5 and 8 mm for the outer (steel) layer.

Other composite structures having an effective Young's modulus less than that of steel can be envisaged that would be in accordance with the present invention and an example is given below.

Using a set of compliant rolls as described above, a given roll flattening is obtained using a lower load by using a material or roll structure with a low effective Young's Modulus. Counter to conventional thinking, this allows the mill to be operated at a higher speed for given gauge and friction conditions.

The amount of roll flattening is also affected by the local pressure between the sheet and work rolls. This pressure decreases with increasing speed. Thus, increasing speed decreases roll flattening and decreases the rolled thickness. Because of this effect, speed is normally used to control the gauge of the sheet. Going faster makes the sheet thinner, going slower makes the sheet thicker. Making the work rolls more compliant, as in the present invention, allows the same gauge of foil to be rolled with the mill running faster. This has great productivity benefits.

The effect of changing the Young's modulus of the work roll is illustrated below in the table of results from a theoretical model according to the present invention.

| Parameter | Base Value | Speed change [m/min] | % Speed change for 50% decrease in Young's Modulus |
|---|---|---|---|
| WR elastic modulus [×10$^{11}$ Pa] | 2.04 (steel) | 607 | 38% |

It can be seen from the table above that a 50% change in Young's modulus can yield a 38% change in rolling speed. Thus, if the Young's modulus of the work rolls is halved to 100 GPa, the rolling speeds can be increased by 38% for the same gauge and other conditions.

The distribution of stresses in such a composite work roll is shown in FIG. 9 which illustrates a portion of the outer shell 10/14 of the roll. It can be seen that the stresses from contact with the metal sheet are very intense in the locality 15 of the contact, but are also present in the substrate. The characteristics of the substrate will therefore influence the effective Young's modulus of a composite roll.

Although the embodiments described above by way of example refer to closed gap rolling, the method of the present invention may also be applied advantageously to near closed gap rolling and to open gap cold rolling. Near closed gap rolling refers to when the work rolls are positioned in use such that the opposing edges of their circumferential surfaces are very close but not touching.

Compliant rolls may also be used when metal sheet is pack rolled, thereby minimising the number of passes needed for producing foil of a required gauge. Pack rolling is the process where a sandwich of two or more layers of metal sheet is fed into the roll gap between the work rolls. On separating the two or more sheets, the sides in contact with the rolls have a shiny surface and the inner surfaces are matt.

The presence of front and back tension in the plane of the metal sheet can also materially affect the rolling load. Back tension is about twice as effective in reducing the rolling load as front tension. It is therefore a preferred feature of the method of using the compliant rolls to have a back tension applied to the metal sheet during the rolling process.

It is further preferred to use a mill with four high stands with work rolls having small diameters of typically between 200 to 450 mm and back up rolls having diameters of typically between 800 and 1000 mm. Using as small diameter work rolls helps to reduce the rolling load through reduced arc if contact between the strip and the work rolls. However, the present invention is not restricted to the use of four high mills and other types of mills may be used advantageously.

It was mentioned above that roll diameter, being a component of the overall compliance of the roll, will also have an effect on the speed of rolling. In fact, the effect of roll diameter on the speed of rolling in closed gap mode is very similar to that of effective Young's modulus. Thus a 10% decease in effective Young's modulus would give the same effect as a 10% increase in roll diameter. However, since mills are designed to run with only a very small range of roll diameters, it is much more convenient to use the effective Young's modulus than the roll diameter as a means of speed increase.

The invention claimed is:

1. A work roll for use in the reduction of the thickness of metal sheet, the work roll having an effective Young's Modulus in the range 40 GPa to 190 GPa, wherein the roll has a composite structure comprising an outermost cylindrical layer and at least one cylindrical inner layer, joined to the outermost layer, and wherein the Young's modulus of the material of the inner layer is lower than that of the outermost layer, and wherein the inner layer comprises a cylindrical core of the roll and an intermediate layer positioned coaxially between the outermost layer and the cylindrical core, and wherein the intermediate layer has a constant radial thickness along the length of the roll.

2. A work roll as claimed in claim 1 wherein the intermediate layer has a radial thickness in the ranges 5 mm to 40 mm.

3. A work roll as claimed in claim 2 wherein the intermediate layer has a radial thickness in the range 20 mm to 40 mm.

* * * * *